United States Patent [19]

Vejvoda

[11] Patent Number: 5,396,729
[45] Date of Patent: Mar. 14, 1995

[54] INFESTATION MONITORING SYSTEM

[76] Inventor: Charles E. Vejvoda, Box 212, R. D.3, Averill Park, N.Y. 12018

[21] Appl. No.: 145,880

[22] Filed: Oct. 29, 1993

[51] Int. Cl.⁶ .............................................. A01M 1/14
[52] U.S. Cl. ..................................................... 43/114
[58] Field of Search ............... 43/107, 114, 121, 132.1

[56]  References Cited

U.S. PATENT DOCUMENTS

| 3,755,958 | 9/1973 | Bradshaw | 43/114 |
| 3,913,259 | 10/1975 | Nishimura | 43/114 |
| 4,244,134 | 1/1981 | Otterson | 43/114 |
| 4,671,010 | 6/1987 | Conlee | 43/114 |

FOREIGN PATENT DOCUMENTS 0202608  9/1983  Germany .............................. 43/107

Primary Examiner—Kurt Rowan
Attorney, Agent, or Firm—Schmeiser, Olsen & Watts

[57] ABSTRACT

A system and monitoring device is disclosed for use in extermination of pests, such as household insects. The monitoring device is used to determine the location, traffic patterns and density concentrations of pests in a building or other environment so as to more efficiently exterminate the pest population by reducing the amount of chemical spray. The monitoring device also includes a remotely activated locator device. The monitoring device may be used singly or ganged in groups of three or more.

11 Claims, 2 Drawing Sheets

INFESTATION MONITORING SYSTEM

FIELD OF THE INVENTION

The present invention relates generally to the extermination of vermin or pests, such as household insects. In particular, the present invention is concerned with an analysis system for minimizing the use of chemical pesticides used in the control of vermin infestation.

BACKGROUND OF THE INVENTION

Extermination of vermin or pests from environments, such as restaurants, warehouses, and grocery stores, is important because of the harm they create. Pests are known carriers of infectious diseases such as salmonella, dysentery, Bubonic plague, leprosy, Lyme disease, and typhoid fever. Additionally, persons who suffer from allergies or asthma are often allergic to certain types of pests.

Removal of vermin or pests from the interior of buildings by periodic chemical pesticide spray treatments has also produced deleterious effects upon humans, plants and beneficials. Humans may become sick or suffer adverse side effects from routine, scheduled, or over spraying of the chemical pesticides. Beneficials, such as a honey bee, butterfly, preying mantis or spider, which are desirable, many times are exterminated along with the pests. The present invention solves this problem by providing a pest management system to eliminate the need for scheduled and routine spraying of pesticides or eliminate the application of chemical pesticides all together.

One prior art device used in pest extermination which eliminates chemical pesticides is the disposable glue trap. Disposable glue traps, however, have not proven adequate in removing a pest population from buildings. For example, in cockroach extermination, only those cockroaches trapped in the glue trap are exterminated. Those cockroaches in the population which avoid the trap continue to multiply. Chemical extermination is more effective in complete extermination of cockroaches because as cockroaches interact the chemical pesticides spread to other cockroaches. The present invention solves the problem of effectively exterminating pests yet minimizing the amount of chemical spray thereby reducing the deleterious effect of chemical spray on humans, plants and beneficials. In addition, the present invention monitors the effectiveness of prior art devices such as the glue trap and would alert the user if more drastic steps were necessary to keep the pest population in check (i.e., if the pest population is stable, decreasing, or increasing). Chemical applications may be necessary only in the rare cases where nonchemical means prove ineffective.

SUMMARY OF THE INVENTION

The present invention is a system and monitoring device used in extermination of pests, such as household insects. The monitoring device is used to determine the location, traffic patterns and density concentrations of pests in a building or other environment so as to more efficiently exterminate the pest population.

The pest management system is initiated with an on-site inspection by a person knowledgeable in the skills of pest identification. The inspection identifies signs of pest access onto the site and locations upon the site of infestation. Common signs of pest access are structural conditions such as interior and exterior cracks, openings, crevices, ledges, etc. Locations of pest infestation are determined by pest residues, smell, etc. These locations are then recorded and stored in a data base.

After the initial inspection, early preventative measures are made for controlling the infestation. For example, modifying portions of the structure so as to prevent pest entry, such as caulking or screening of openings; cleaning of organic and nonorganic waste products which attract pests to the structural site; proper storing of food products or other organic matter; evaluating occupant practices which increase the risk of pest infestation; and determining the most appropriate chemicals for use in extermination of the site. Certain chemical pesticides should be avoided at certain sites due to the type of environment and health risks to certain individuals. Pesticides should only be used in certain on-site locations, such as bedrooms, closets, hallways, stairwells, planting beds, after careful monitoring.

Once early preventative measures are taken, the pest monitoring devices are put in place. Before placement, location and placement time of each pest monitoring device is recorded either manually or preferably electronically into a data storage device or computer. The monitoring devices are left in place for a period of time and then are retrieved. Data is then recorded manually or entered into a computer regarding the elapse of time, the location of the monitoring device, the type of pest, concentration of pests, and traffic patterns. This data provides the information necessary to more efficiently determine ongoing pest control strategies such as determining precise location of infestation for localized chemical pesticide application, appropriate spray amounts, specific pesticides, and spray concentrations. By determining spray amounts and concentrations, the actual chemical spray can be decreased so as to minimize the harm to humans and beneficials.

DETAILED DESCRIPTION OF THE PREFERRED EMBODIMENTS

Figure 1:
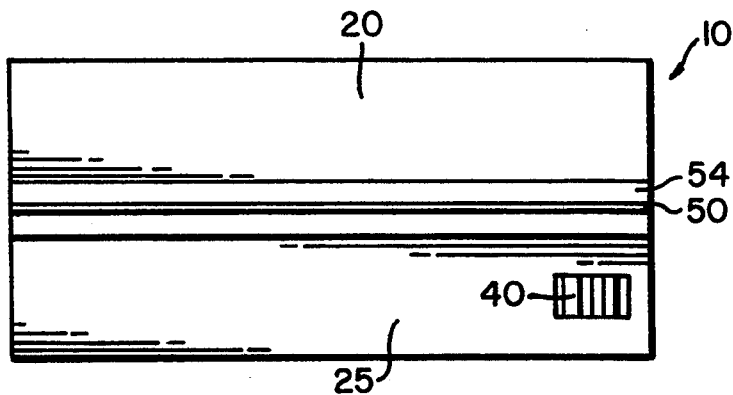
FIG. 1 is a top view of the pest monitoring trap of the present invention.
Figure 2:
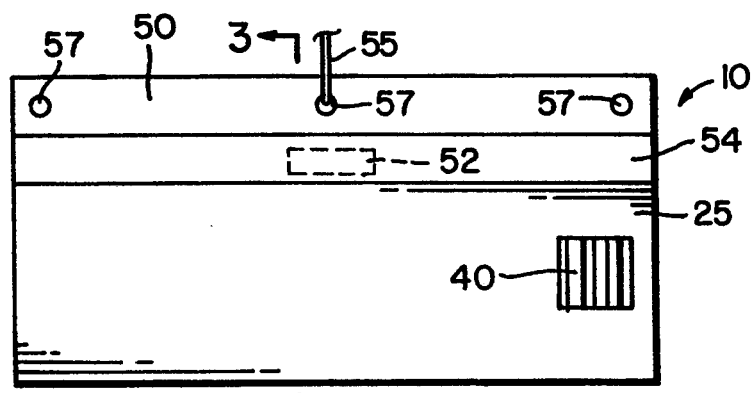
FIG. 2 is a side view of the pest monitoring trap of the present invention.
Figure 7:
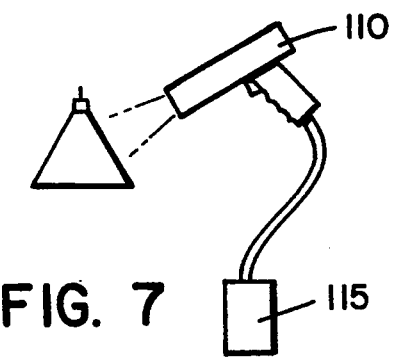
FIG. 7 is a pictorial representation of data storage device from a pest monitoring device of the present invention.
Figure 5:
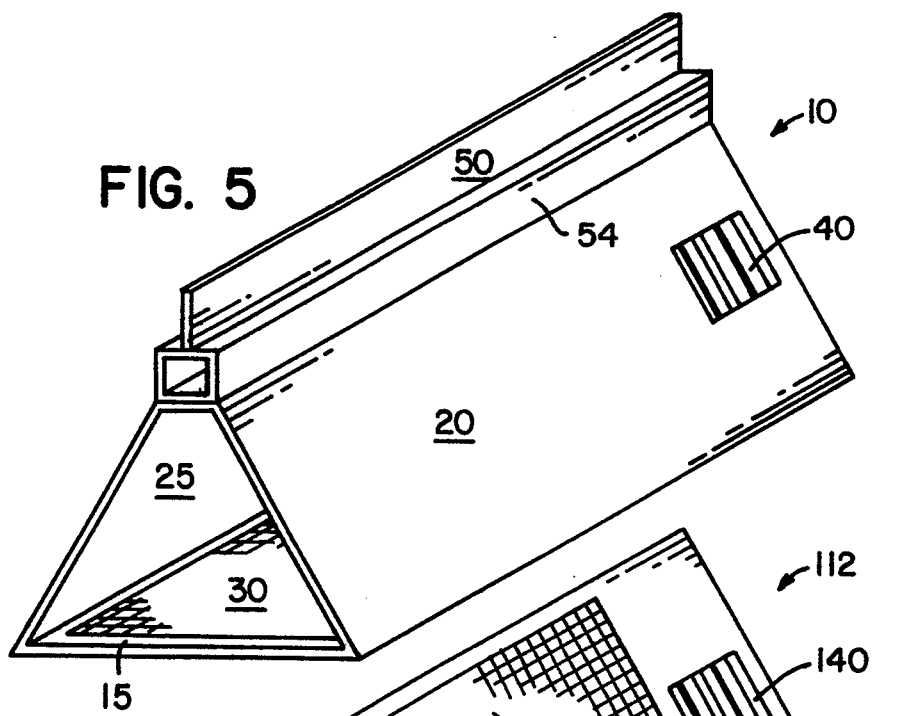
FIG. 5 is a perspective view of a pest monitoring trap of the present invention.

FIGS. 1 and 2 show a top and side view and FIG. 5 illustrates a perspective view of an insect monitoring device 10 of the present invention. On one side 25 of the monitoring device 10 a data input label or bar code 40 is attached. The bar code 40 may be attached by any conventional adhesion, such as glue, tape, etc. For identification of the particular monitoring device 10, the bar code 40 is read into a data storage device or computer 115 through an optical scanner 110 (FIG. 7). Other than a bar code, other types of computer identification strips may be used for purposes of identification of the location and time of placement of each insect monitoring device 10. In the case of manual monitoring, an alphabetic or numeric identifier may be used.

As shown in FIGS. 1, 2 and 5, the insect monitoring device 10 includes a pick-up strip 50 for ease of placement and removal. The pick-up strip 50 contains a plurality of holes 57 for attachment of a suspension device 55 such as a string or wire. The suspension device 55 allows the user to suspend the monitoring device 10 during scanning.

Figure 6:
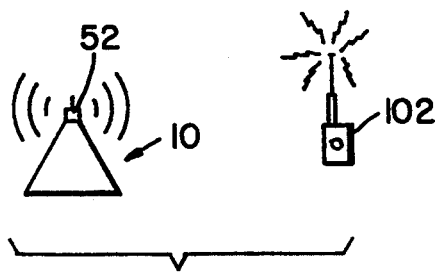
FIG. 6 is a pictorial representation of the pest monitoring system locator device.

Below the pick-up strip 50 is an electronic locator beeper 52. The locator beeper 52 may be attached by adhesives to the outside of the monitoring device 10 or may placed in a containment structure 54. As shown in FIG. 6, the locator beeper 52 is activated by a signal generating device 102, such as a hand held transmitter. The locator beeper 52 may also be activated by a noise such as a hand clap. Such locator beepers 52 are similar to those used with vehicles for setting alarms; unlocking doors; or finding keys on a key chain.

Figure 3:
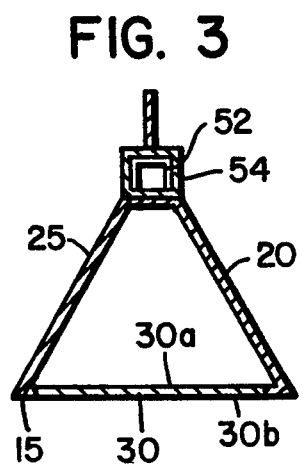
FIG. 3 is a cutaway view of the pest monitoring trap taken along lines 3—3 of FIG. 2.

FIG. 3 illustrates a cutaway side view taken through lines 3—3 of FIG. 2. Sidewalls 20, 25 and base surface 15 adjoin to form a triangular-shaped monitoring device 10. At the apex of the triangle is the locator beeper containment structure 54, which is shown in FIGS. 3-9 as an elongate compartment. Other cross-sectional shapes are also contemplated such as square, rectangular or other combination of polygonal and/or curvilinear shapes. A triangular-shape is chosen for ease of manufacture and cost savings in materials.

Figure 4:
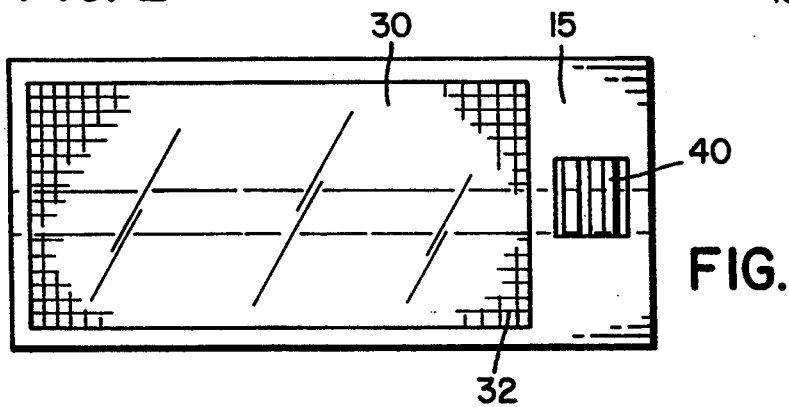
FIG. 4 is a bottom view of the pest monitoring trap of the present invention.

As shown in FIGS. 3, 4 and 5 a transparent adhesive trap or vermin density analysis surface 30 including a top surface 30a and a bottom surface 30b positioned along the base surface 15 of the monitoring device 10. The trap 30 may be integrally formed on the base surface 15 or it may be removable and replaceable for off-site density analysis. The top surface 30a of the trap 30 contains both an adhesive and an attractor. The attractor may be a pheromone or bait adapted to the particular target insect population.

Figure 8:
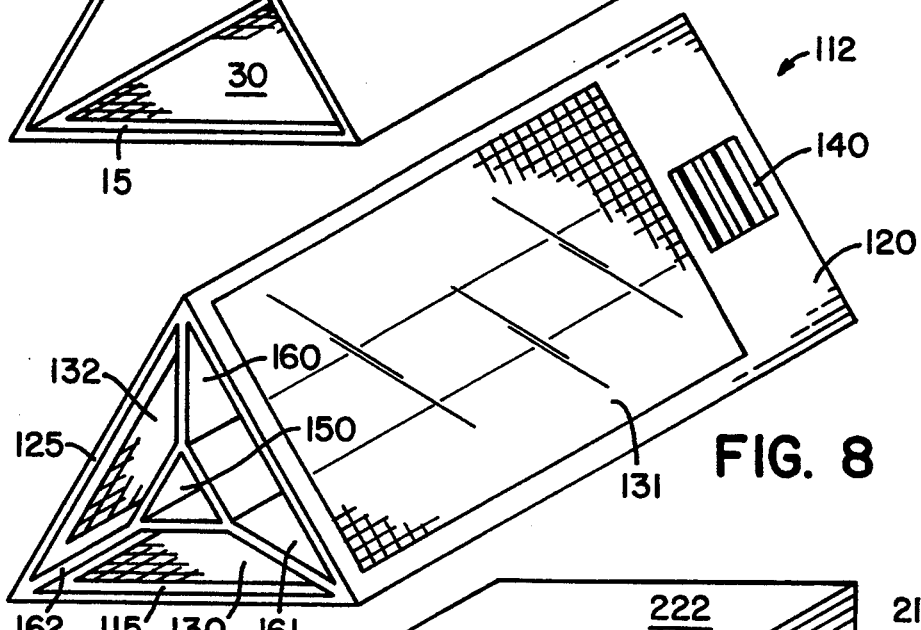
FIG. 8 is a perspective view of a second embodiment of the pest monitoring device of the present invention.

FIG. 8 illustrates a second embodiment of the present invention. The monitoring device 112 can be either three monitoring devices 10 connected together to form an isosceles triangle or it can be integrally formed. The device 112 includes base surfaces 115, 120, 125 having transparent adhesive traps or vermin density analysis surfaces 130, 131, 132 and side surfaces 160, 161, 162. Centrally located is a locator beeper containment structure 150. An advantage of the device 112 is that three separate readings may be taken from the same device without the need for replacing the grid trap surfaces 130, 131, 132 or inputing the location data from a replacement monitoring device.

Figure 9:
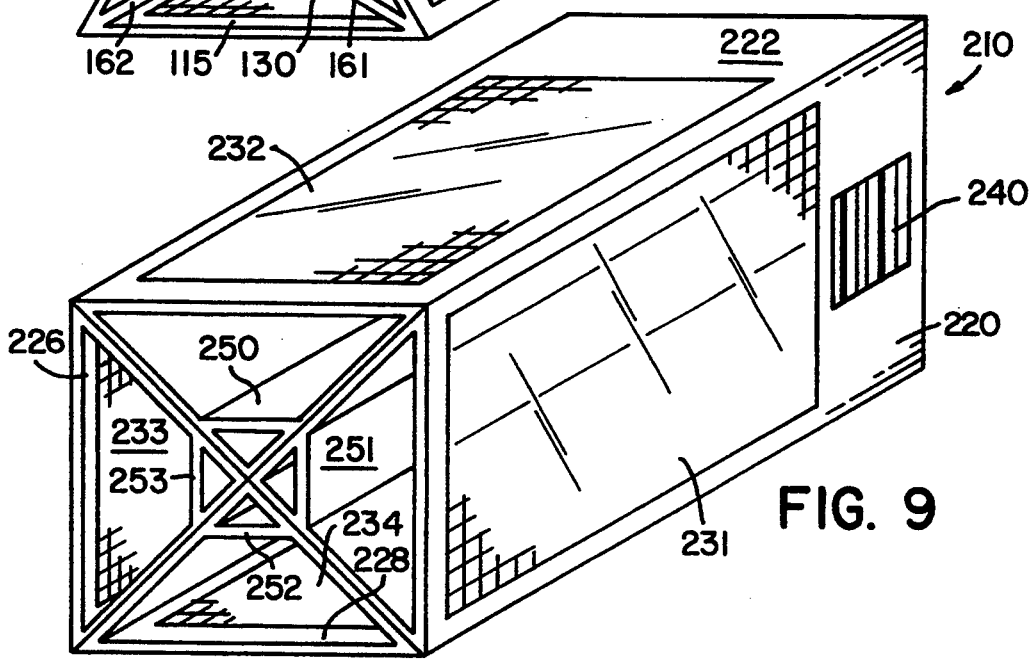
FIG. 9 is a perspective view of a third embodiment of the pest monitoring device of the present invention.

The third embodiment shown in FIG. 9 has a similar advantage to the second embodiment shown in FIG. 8. Instead of three monitoring devices being connected or having three sides integrally formed, the monitoring device 210 includes four monitoring devices removably or integrally joined. The device 210 includes base surfaces 220, 222, 226, 228 having transparent adhesive traps or vermin density analysis surfaces 231, 232, 233, 234 with side surfaces extending therefrom. Centrally located is locator beeper containment structures 250, 251, 252, 253.

In operation each monitoring device's data input label or bar code 40, 140, 240 is manually recorded or scanned into a data input device or computer 115 to record location and time of placement. After the monitoring device 10 has been left at the monitoring site over a period of time and captured pests are allowed to accumulate in the trap 30, the monitoring device 10 is then retrieved. Capture data is then manually recorded or scanned into the computer by optical scanner 110 across the bar code label 40 and the grid lines 32 on the pest density analysis surface 30. The scanner 110 records where the monitoring device 10 was located and the computer 115 accounts for the time elapsed for that particular monitoring device. The grid lines 32 act as a distance reference frame to assist in recording density and traffic flow data into a data storage device or computer 115. Computer software then filters out overlapped pests and identifies the type of pest by shape and size. The computer software used in the system herewith has not been disclosed, but may be readily obtained through routine experimentation by an artisan of ordinary skill in the art. The density and location of the pests on the grid are recorded manually or scanned into the computer due to the absence of light passage through the transparent trap or density analysis surface 30.

In order to obtain optimal scanning results, the inner surfaces of the sidewalls 20, 25 are formed from a material having a color which differentiates from the target pests. In the case of manual recording or when the density analysis surface 30 is removable for off-site data input, the color of the side walls 20, 25 is not as important.

After all the data has been assimilated, the exterminator uses charts, graphs, tables, records or the like, or the computer software to suggest possible recommendations for elimination of the pest population by methods such as structural modifications, cleaning, etc. If the pest population cannot be efficiently eliminated by non-chemical methods, the appropriate chemical pesticides including spray amounts and concentrations are recommended.

After the system has been implemented, it is continued on a periodic basis to eliminate the infestation. If the infestation has been eliminated, the system is used as a preventative maintenance tool to prevent future infestations.

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

I claim:

1. A pest monitoring device comprising:
   a base surface having a transparent adhesive vermin trap with a density grid thereon; and
   at least one other surface,
   wherein at least one of said base surface or said other surface includes a data input label thereon, whereby the monitoring device may be retrieved and a pest population density determined with the density grid such that the amount of pesticide applied may be minimized by placing a greater amount of pesticide in areas with a higher reading on said density grid and less pesticide in areas with a lower reading on said density grid.

2. The pest monitoring device of claim 1, including an electronic locator device inserted in an elongate compartment.

3. The pest monitoring device of claim 1, wherein the data input label is a bar code.

4. The pest monitoring device of claim 1, wherein transparent adhesive includes an attractor thereon.

5. A pest monitoring device comprising:
a first surface including a vermin density analysis surface with a density grid thereon; and
at least one other surface,
wherein at least one of said first surface or said other surface includes a data input label thereon, whereby the monitoring device may be retrieved and a past population density determined with the density grid such that the amount of pesticide applied may be minimized by placing a greater amount of pesticide in areas with a higher reading on said density grid and less pesticide in areas with a lower reading on said density grid.

6. The pest monitoring device of claim 5, wherein the pest density analysis device includes a transparent adhesive.

7. The pest monitoring device of claim 5, wherein the data input label is a bar code label.

8. The pest monitoring device of claim 6, wherein density analysis grid includes an attractor thereon.

9. The pest monitoring device of claim 5, including an electronic locator device inserted in an elongated compartment.

10. A method for exterminating pests comprising:
providing at least one adhesive pest monitoring device having a density grid to reduce the amount of pesticide used in pest extermination;
placing at least one of said pest monitoring devices at a site;
providing an elapse of time, whereby pests may enter said monitoring device;
recording pest density data obtained from said pest monitoring device; and
applying pesticide in accordance with said pest density data such that the amount of pesticide applied may be minimized by placing a greater amount of pesticide in areas with a higher reading on said density grid and less pesticide in areas with a lower reading on said density grid.

11. The method for exterminating pests of claim 10, wherein the step of recording pest density data includes:
inputing pest density data into a computer.

* * * * *